(12) United States Patent
Zhang et al.

(10) Patent No.: US 12,530,543 B2
(45) Date of Patent: Jan. 20, 2026

(54) IMPLEMENTING CONTROLLABLE LYRICS GENERATION

(71) Applicant: Lemon Inc., Grand Cayman (KY)

(72) Inventors: Xueying Zhang, Culver City, CA (US); Shizhu Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 228 days.

(21) Appl. No.: 18/540,691

(22) Filed: Dec. 14, 2023

(65) Prior Publication Data

US 2025/0200302 A1    Jun. 19, 2025

(51) Int. Cl.
*G06F 40/56* (2020.01)

(52) U.S. Cl.
CPC .................................. *G06F 40/56* (2020.01)

(58) Field of Classification Search
CPC ........................................................ G06F 40/56
See application file for complete search history.

(56) References Cited

U.S. PATENT DOCUMENTS

| | | | |
|---|---|---|---|
| 10,249,300 B2 * | 4/2019 | Booker | G06F 16/3344 |
| 11,227,589 B2 * | 1/2022 | Booker | G10L 15/08 |
| 12,361,221 B2 * | 7/2025 | Liu | G06F 40/30 |
| 2014/0095487 A1 * | 4/2014 | Kurz | G06F 16/2453 707/722 |
| 2018/0262452 A1 * | 9/2018 | Guthery | G06Q 30/0601 |
| 2019/0065468 A1 * | 2/2019 | Nazer | G06F 40/30 |
| 2019/0066641 A1 * | 2/2019 | Nazer | G06F 40/279 |
| 2019/0306100 A1 * | 10/2019 | Guthery | G10L 15/26 |
| 2020/0137011 A1 * | 4/2020 | Guthery | G06Q 40/12 |
| 2020/0364303 A1 * | 11/2020 | Liu | G10L 15/22 |

OTHER PUBLICATIONS

Y.-F. Huang and K.-C. You, "Automated Generation of Chinese Lyrics Based on Melody Emotions, " in IEEE Access, vol. 9, pp. 98060-98071, 2021, doi: 10.1109/ACCESS.2021.3095964. keywords: {Feature extraction;Training;Rhythm;Natural language processing;Timbre;Semantics;Harmonic analysis;Lyric generatio (Year: 2021).*

S. F. R. Ali, T. P. S. D. Thanuj, D. S. S. Kiran and M. Ashwin, "Recommender System using Audio and Lyrics, " 2023 4th International Conference on Electronics and Sustainable Communication Systems (ICESC), Coimbatore, India, 2023, pp. 772-781, doi: 10.1109/ICESC57686.2023.10193474. keywords: {Electric (Year: 2023).*

* cited by examiner

*Primary Examiner* — Bharatkumar S Shah
(74) *Attorney, Agent, or Firm* — BakerHostetler

(57) ABSTRACT

The present disclosure describes techniques for implementing controllable lyrics generation. A first sub-model of a system is trained on training data pairs. Each pair of training data is generated based at least in part on extracting music-related attributes from lyrics. Each pair of training data comprises the lyrics and a reconstructed prompt indicative of the music-related attributes. A user input is received by a second sub-model of the system. The user input comprises text specifying a theme of lyrics to be generated by the system. A prompt is generated based on the text and format attributes by the second sub-model. A plurality of sets of lyrics are generated by the first sub-model based on the generated prompt. The plurality of sets of lyrics are ranked by a third sub-model of the system. The plurality of sets of lyrics are ranked based on predetermined music-related rules.

20 Claims, 11 Drawing Sheets

700

Receive a user input by a second sub-model of a system, wherein the user input comprises text specifying a theme of lyrics to be generated by the system 702

Determine a target number of lines in lyrics to be generated 704

Determine a target range of syllables in each line of the lyrics to be generated 706

Generate a prompt based on text, the target number of lines, and the target range of syllables by the second sub-model 708

Train a first sub-model of a machine learning model on training data pairs, wherein each pair of training data is generated based at least in part on extracting music-related attributes from lyrics, and wherein each pair of training data comprises the lyrics and a reconstructed prompt indicative of the music-related attributes 802

Receive a user input by a second sub-model of the machine learning model, wherein the user input comprises text specifying a theme of lyrics to be generated by the machine learning model 804

Generate a prompt based on the text and format attributes by the second sub-model, wherein the prompt has a structure that is consistent with a structure of the reconstructed prompt in each pair of training data 806

Generate a plurality of sets of lyrics by a first sub-model based on a prompt, wherein the prompt is generated based on user input and format attributes 902

Determine a score corresponding to each of a plurality sets of lyrics based on predetermined music-related rules and a weight assigned to each of the predetermined music-related rules 904

Rank the plurality sets of lyrics based on the score corresponding to each of the plurality sets of lyrics 906

Identify a predetermined number of top-ranking sets of lyrics as candidate sets of lyrics 908

FIG. 9

IMPLEMENTING CONTROLLABLE LYRICS GENERATION

BACKGROUND

Machine learning models are increasingly being used across a variety of industries to perform a variety of different tasks. Such tasks may include music-related tasks. Improved techniques for utilizing machine learning models for music-related tasks are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows an example process for implementing controllable lyrics generation in accordance with the present disclosure.

FIG. 8 shows an example process for implementing controllable lyrics generation in accordance with the present disclosure.

FIG. 9 shows an example process for implementing controllable lyrics generation in accordance with the present disclosure.

DETAILED DESCRIPTION OF ILLUSTRATIVE EMBODIMENTS

Machine learning models, such as large-language models (LLMs), may be used to generate song lyrics. For example, a machine learning model may receive text instructions from a user. The text instructions may indicate that the user wants the machine learning model to generate song lyrics about "love." In response to receiving these text instructions, the machine learning model may generate song lyrics about "love."

The song lyrics may be paired with music to generate a song. Accordingly, it is desirable for the generated song lyrics to pair well with (e.g., sound good with) the melody of the music. However, existing lyric-generation machine learning models do not generate lyrics based on music-related attribute. For example, current state-of-the-art LLMs have relatively weak control capabilities over music-related attributes. As such, using these existing lyric-generation machine learning models to generate lyrics can result in a mismatch between the lyrics and the song melody. As such, improved techniques for lyrics generation are desirable.

Figure 1:
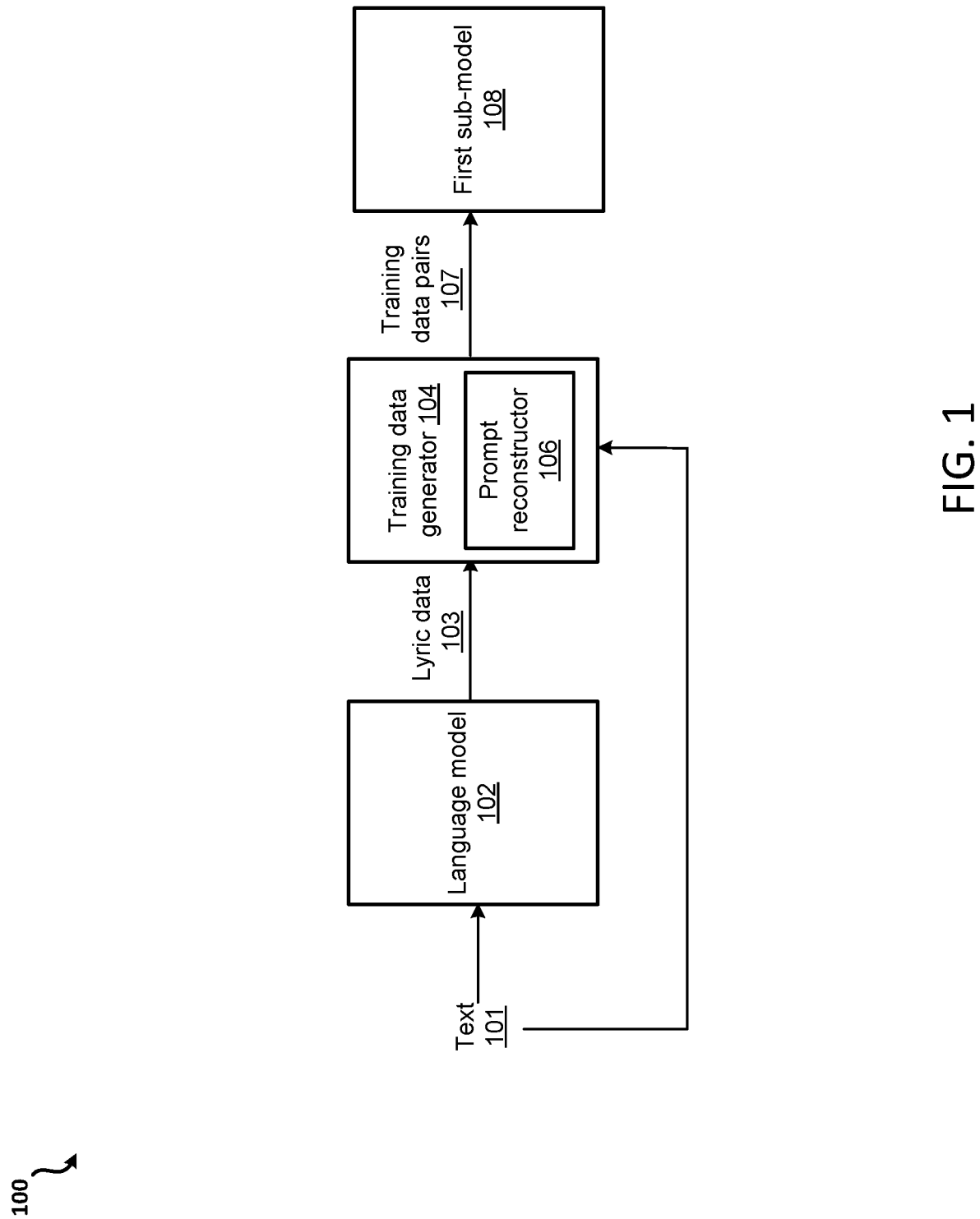
FIG. 1 shows generating training data and training a machine learning model to implement controllable lyrics generation in accordance with the present disclosure.

Described herein are improved techniques for lyric generation. Unlike existing techniques, which have weak control capabilities over music-related attributes, the techniques described herein may be utilized to generate song lyrics based on musical attribute requirements. FIG. 1 shows a diagram 100 in accordance with the present disclosure. The diagram 100 illustrates generating training data and training a machine learning model to implement controllable lyrics generation. The diagram 100 may comprise a language model 102, a training data generator 104, and a first sub-model 108.

In embodiments, text 101 may be input into (e.g., received by) the language model 102. The text 101 may indicate content (e.g., a topic, a keyword, a central sentence, a theme, etc.) associated with song lyrics to be generated. The language model 102 may generate a set of lyrics based on a text (e.g., text 101). This process may be repeated numerous times (e.g., with the same and/or with different input texts) to generate a plurality of sets of raw lyric data 103 (e.g., copyright free lyric data). The plurality of sets of raw lyric data correspond to initial prompts (e.g., input texts).

A training data generator 104 may generate training data pairs 107 based on the plurality of sets of raw lyric data 103 and the initial prompts (e.g., input texts). In embodiments, generating the training data pairs may comprise generating initial data pairs based on selecting lyrics with rhyme pattern(s) from the plurality of sets of raw lyric data 103. The selected lyrics may have the same or different rhyming patterns. Each of the initial data pairs may comprise an initial prompt (e.g., input text) and a set of selected lyrics corresponding to the initial prompt (e.g., input text).

The training data generator 104 may comprise a prompt reconstructor 106. The prompt reconstructor 106 may reconstruct the initial data pairs to generate the training data pairs 107. Reconstructing the initial data pairs may comprise determining music-related attributes associated with the selected lyrics in each of the initial data pairs. The music-related attributes may comprise lyric format-related attributes (e.g., attributes related to the format of each set of selected lyrics). For example, the music-related attributes may comprise a number of lines in each set of selected lyrics. The music-related attributes may comprise a number of syllables or a syllable range in each lyric line. Any other music-related attributes and/or lyric format-related attributes may be determined.

Reconstructing the initial data pairs may comprise reconstructing the prompt (e.g., input text) in each of the initial data pairs. The prompt in each of the initial data pairs may be reconstructed based on integrating the initial prompt (e.g., input text) with the determined music-related attributes. For example, a reconstructed prompt in a pair of training data may follow this template: "Write a n-line paragraph of lyrics about x. Each line of the lyrics should contain a-b syllables," wherein "x" corresponds to the initial prompt (e.g., input text), "n" represents the number of lines in the lyrics, and "a-b" indicates the syllable range for each sentence or lyric line.

For example, an initial data pair may comprise (i) the text input "love" and (ii) a set of selected lyrics about love. It may be determined that the lyrics about love comprise fifteen lines, with each line having five to ten syllables. The reconstructed prompt for this training data pair may be as follows: "Write a fifteen-line paragraph of lyrics about love. Each line of the lyrics should contain five to ten syllables." As another example, an initial data pair may comprise (i) the text input "nature" and (ii) a set of selected lyrics about nature. It may be determined that the lyrics about nature comprise twenty lines, with each line having ten to twelve syllables. The reconstructed prompt for this training data pair may be as follows: "Write a twenty-line paragraph of lyrics about nature. Each line of the lyrics should contain ten to twelve syllables."

After prompt reconstruction, the generated training data pairs 107 may each comprise the reconstructed prompt and the corresponding set of selected lyrics with a rhyme pattern. As one example, if the initial data pair comprises (i) the prompt "love" and (ii) a set of selected lyrics about love, and the reconstructed prompt for this data pair is "Write a fifteen-line paragraph of lyrics about love. Each line of the lyrics should contain five to ten syllables," the reconstructed training data pair 107 may comprise (i) the reconstructed prompt "Write a fifteen-line paragraph of lyrics about love. Each line of the lyrics should contain five to ten syllables," and (ii) a set of selected lyrics about love that has rhyme pattern(s).

As another example, if the initial data pair comprises (i) the prompt "nature" and (ii) a set of selected lyrics about nature, and the reconstructed prompt for this pair is "Write a twenty-line paragraph of lyrics about nature. Each line of the lyrics should contain ten to twelve syllables," the reconstructed training data pair may comprise (i) the reconstructed prompt "Write a twenty-line paragraph of lyrics about nature. Each line of the lyrics should contain ten to twelve syllables," and (ii) the set of selected lyrics about nature. The reconstructed training data pairs 107 may be used to train or fine-tune the first sub-model 108. The first sub-model 108 may comprise a machine learning model.

Figure 2:
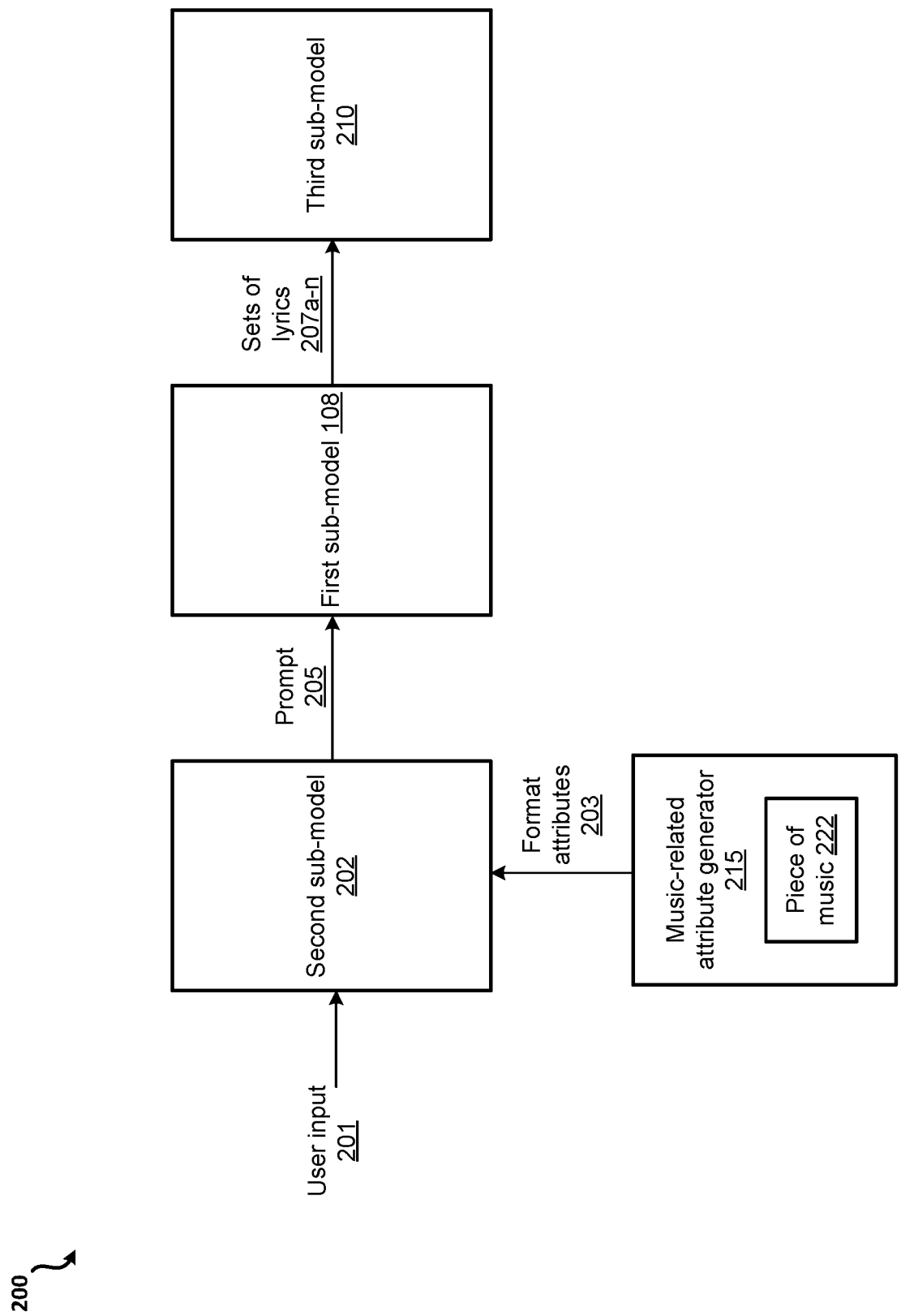
FIG. 2 shows an example system for implementing controllable lyrics generation in accordance with the present disclosure.

The trained first sub-model 108 may be used to generate song lyrics based on musical attribute requirements. For example, trained first sub-model 108 may be part of a system for implementing controllable lyrics generation in accordance with the present disclosure. FIG. 2 shows an example system 200 for implementing controllable lyrics generation. The system 200 comprises the trained first sub-model 108, a second sub-model 202, a third sub-model 204, and a music-related attribute generator 215.

The second sub-model 202 may receive a user input 201. The user input 201 may comprise text. The text may specify content (e.g., a topic, a keyword, a central sentence, a theme, etc.) associated with song lyrics to be generated by the system 200. The second sub-model 202 may receive format attributes 203. The format attributes 203 may indicate a format of at least one piece of music 222. The format attributes 203 may indicate a target (e.g., desired, ideal) number of lines for the lyrics to be generated. The format attributes 203 may indicate a target (e.g., desired, ideal) range of syllables in each line of the lyrics to be generated. For example, the target number of lines for the lyrics may indicate an ideal or desired number of lyric lines and/or range of syllables in each lyric line to ensure that the generated lyrics sound good with a piece of music, e.g., the piece(s) of music 222. The piece(s) of music 222 may be predetermined (e.g., preselected). The piece(s) of music 222 may comprise a piece of music that a user wants to add lyrics to.

The second sub-model 202 may receive the format attributes 203 from the music-related attribute generator 215. The music-related attribute generator 215 may determine the format attributes 203. The music-related attribute generator 215 may determine the format attributes 203 based on the piece(s) of music 222. Determining the format attributes based on the piece(s) of music 222 may comprise determining the target (e.g., desired, ideal) number of lines in the lyrics to be generated. Determining the format attributes based on the piece(s) of music 222 may comprise determining a target (e.g., desired, ideal) range of syllables in each line of the lyrics to be generated. The music-related attribute generator 215 may send the determined format attributes 203 to the second sub-model 202.

The second sub-model 202 may generate a prompt 205 based on the user input 201 and the format attributes 203. The prompt 205 may be generated based on integrating the user input 201 (e.g., text) with the format attributes 203. The generated prompt may follow the same and/or a similar template as the reconstructed prompt in each pair of training data. For example, if the user input 201 is "party" and the format attributes 203 indicate that the target number of lines is thirteen lines and the target range of syllables in each line is five to seven, the generated prompt 205 may be as follows: "Write a thirteen-line paragraph of lyrics about a party. Each line of the lyrics should contain five to seven syllables."

The trained first sub-model 108 may receive the prompt 205. The trained first sub-model 108 may generate a plurality of sets of lyrics 207a-n. The trained first sub-model 108 may generate a plurality of sets of lyrics 207a-n based on (e.g., using) the prompt 205. The third sub-model 210 may be configured to identify a predetermined number of top-ranking sets of lyrics from the plurality of sets of lyrics 207a-n as candidate sets of lyrics.

Figure 3:
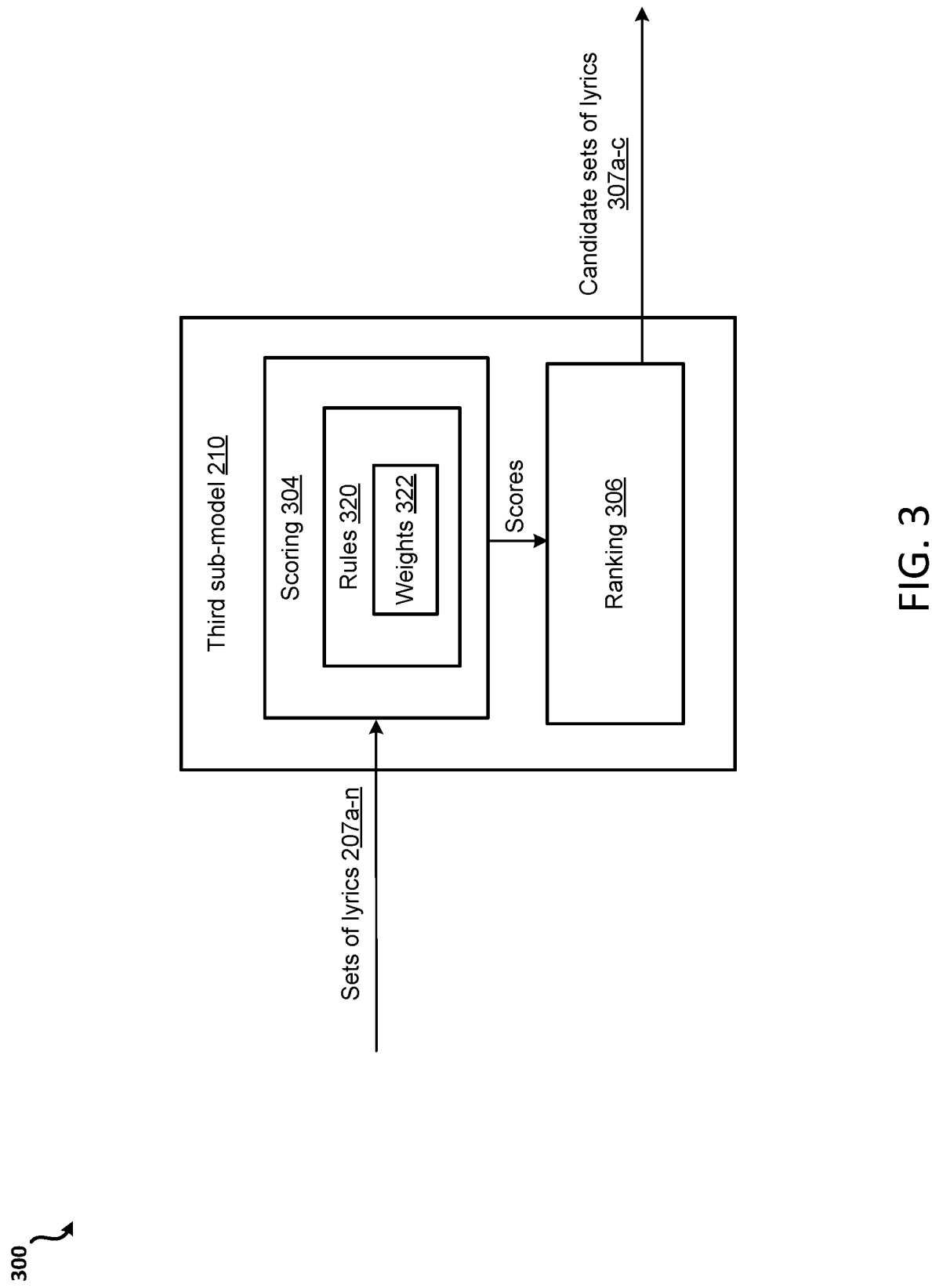
FIG. 3 shows an example third sub-model in accordance with the present disclosure.

FIG. 3 shows the third sub-model 210 in more detail. The third sub-model 210 may comprise a scoring component 304 and a ranking component 306. The plurality of sets of lyrics 207a-n may be input into (e.g., received by) the third sub-model 210. The scoring component 304 may be configured to score each of the plurality of sets of lyrics 207a-n. The scoring component 304 may be configured to score each of the plurality of sets of lyrics 207a-n based on (e.g., using) predetermined music-related rules.

In embodiments, the predetermined music-related rules may comprise a first rule associated with a number of lyric lines. The first rule may be associated with a first weight. The predetermined music-related rules may comprise a second rule associated with a range of syllables in each lyric line. The second rule may be associated with a second weight. The predetermined music-related rules may comprise a third rule associated with a rhyme pattern. The third rule may be associated with a third weight. The first weight, second weight, and third weight may be adjusted (e.g., manually). A greater weight assigned to a particular rule may indicate that the rule is more important when ranking the plurality of sets of lyrics 207a-n. For example, if the first rule is assigned a greater weight than the second and third rule, this may indicate that the number of lyric lines is more important than the range of syllables or the rhyme pattern when ranking the plurality of sets of lyrics 207a-n.

The scoring component 304 may be configured to determine a score (e.g., a weighted score) corresponding to each of the plurality sets of lyrics 207a-n based on each of the predetermined music-related rules and the weight assigned to each of the predetermined music-related rules. The ranking component 306 may be configured to rank the plurality sets of lyrics 207a-n based on the score corresponding to each of the plurality sets of lyrics 207a-n. For example, the ranking component 306 may be configured to rank the plurality sets of lyrics 207a-n in an order from highest to lowest score. The ranking component 306 may be configured to identify (e.g., determine) a predetermined number of top-ranking sets of lyrics as candidate sets of lyrics. For example, the ranking component 306 may be configured to identify (e.g., determine) the three top-ranking (e.g., highest scoring) sets of lyrics from the plurality sets of lyrics 207a-n. The predetermined number of top-ranking (e.g., highest scoring) sets of lyrics 207a-c may be the candidate sets of lyrics.

Figure 4:
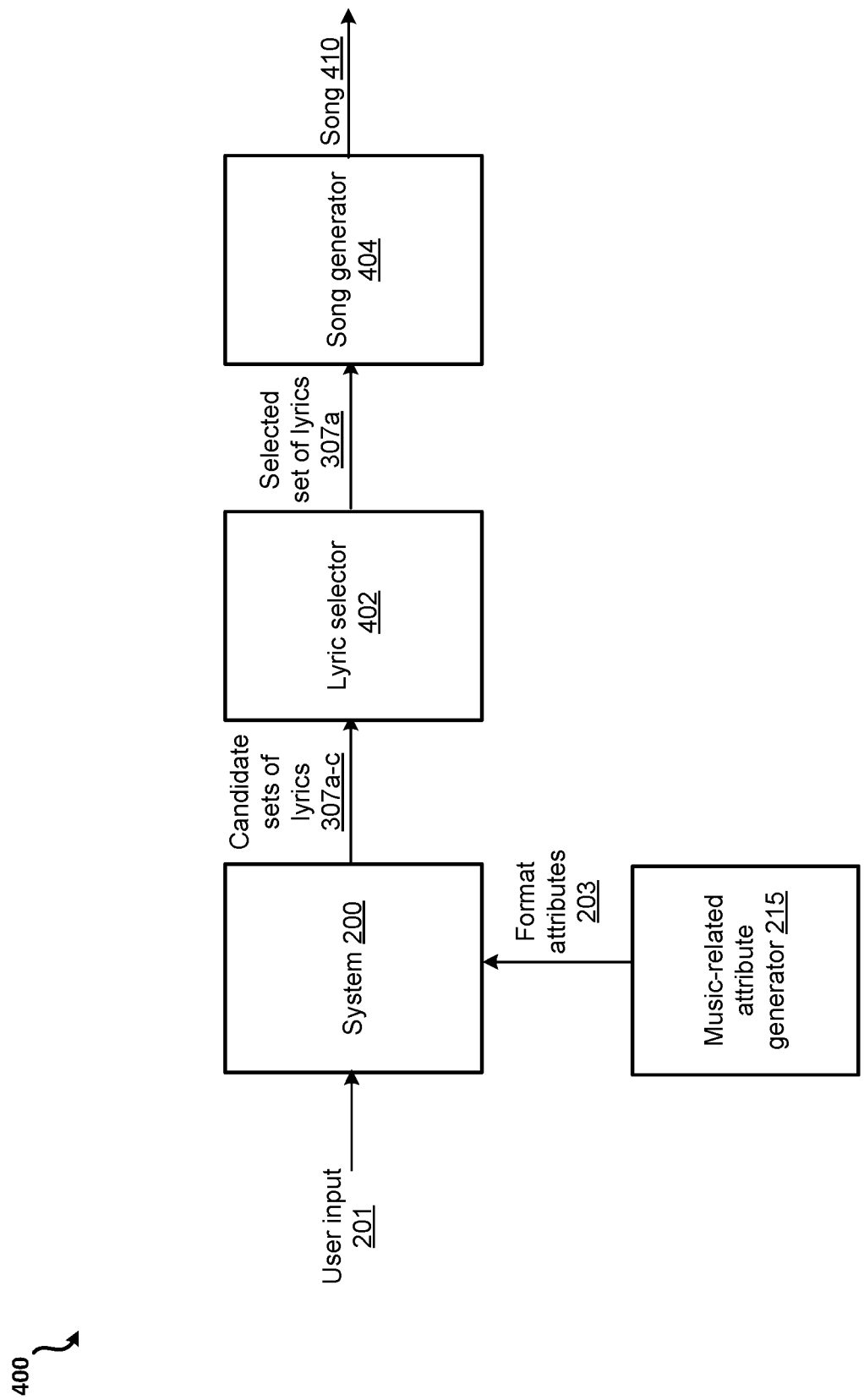
FIG. 4 shows an example system for generating a song based on machine-generated lyrics in accordance with the present disclosure.

In embodiments, the candidate sets of lyrics 207a-c may be used to generate a song. FIG. 4 shows an example system 400 for generating a song based on the candidate sets of lyrics 207a-c. The system 400 may comprise a lyric selector 402 and a song generator 404. The lyric selector 402 may receive the candidate sets of lyrics 207a-c from the system 200. The lyric selector 402 may determine at least one set of lyrics from the candidate sets of lyrics 207a-c. The lyric selector 402 may determine at least one set of lyrics (e.g., the set of lyrics 207a) from the candidate sets of lyrics 207a-c based on the piece(s) of music 222 corresponding to the format attributes 203. For example, the lyric selector 402 may determine which one of the candidate sets of lyrics 207a-c sounds best (e.g., fits best) with the melody of the piece(s) of music 222. The lyric selector 402 may send the selected set(s) of lyrics (e.g., the set of lyrics 207a) to the song generator 404. The song generator 404 may generate a song 410 based on the selected set(s) of lyrics and the piece(s) of music 222.

Figure 5:
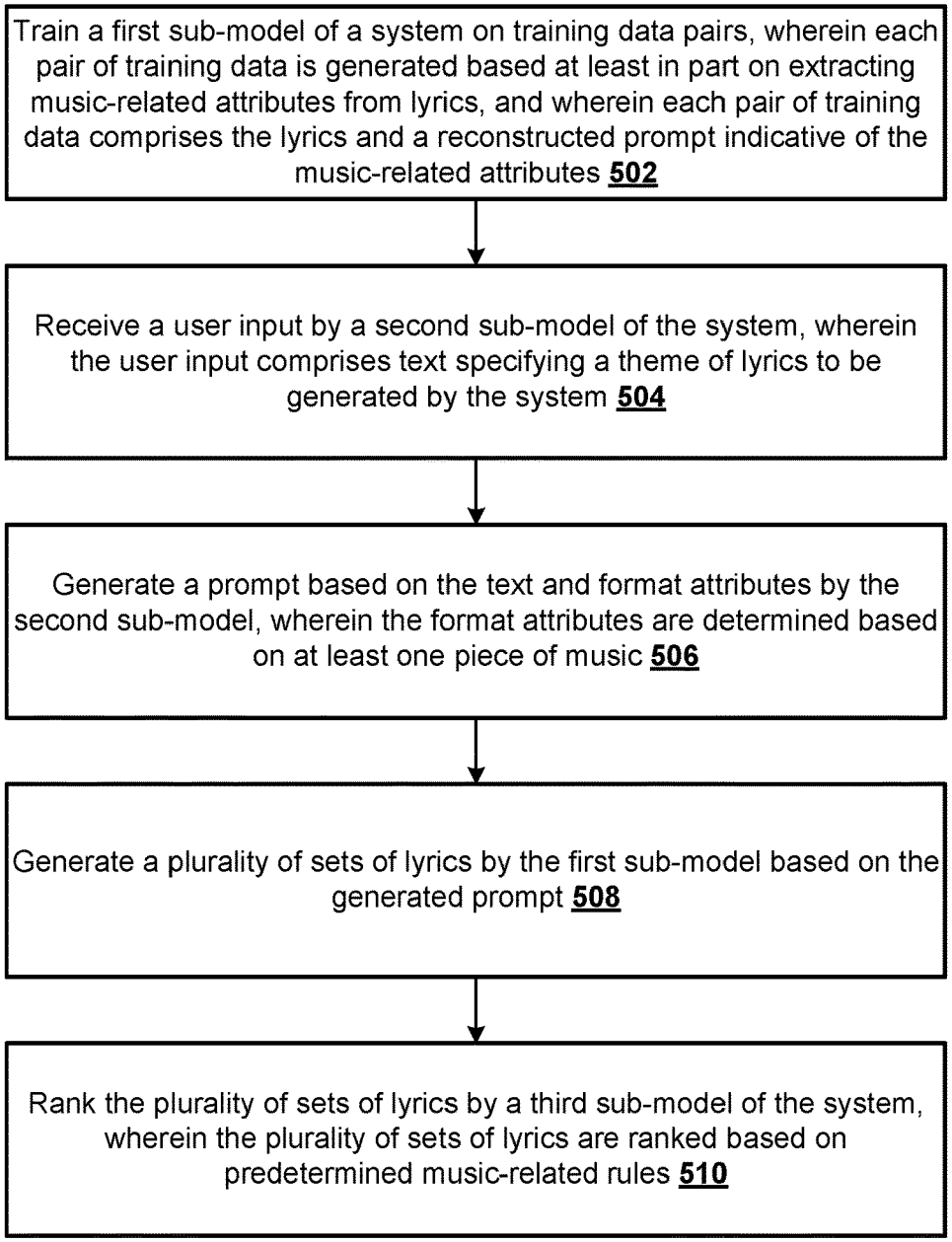
FIG. 5 shows an example process for implementing controllable lyrics generation in accordance with the present disclosure.

FIG. 5 illustrates an example process 500 for implementing controllable lyrics generation in accordance with the present disclosure. Although depicted as a sequence of operations in FIG. 5, those of ordinary skill in the art will appreciate that various embodiments may add, remove, reorder, or modify the depicted operations.

A training data generator may generate initial data pairs based on a plurality of sets of raw lyric data and corresponding input texts. The initial data pairs may be generated based on selecting lyrics with a rhyme pattern from of raw lyric data (e.g., the plurality of sets of raw lyric data 103). A prompt reconstructor may reconstruct the initial data pairs to generate reconstructed training data pairs. Reconstructing the initial data pairs may comprise determining music-related attributes associated with the selected lyrics in each of the initial data pairs. The music-related attributes may be lyric format-related attributes (e.g., attributes related to the format of each set of selected lyrics). For example, the music-related attributes may comprise a number of lines in each set of selected lyrics. The music-related attributes may comprise a number of syllables or a syllable range in each lyric line.

Reconstructing the initial data pairs may comprise reconstructing the prompt in each of the initial data pairs. The prompt in each of the initial data pairs may be reconstructed based on integrating the initial prompt (e.g., text) with the determined music-related attributes. For example, a reconstructed prompt for a pair of training data may follow this template: "Write a n-line paragraph of lyrics about x. Each line of the lyrics should contain a-b syllables," wherein "x" corresponds to the initial prompt (e.g., text), "n" represents the number of lines in the lyrics, and "a-b" indicates the syllable range for each sentence or lyric line.

After prompt reconstruction, the generated training data pairs may each comprise the reconstructed prompt and the corresponding set of selected lyrics with rhyme pattern(s). The reconstructed training data pairs may be used to train or fine-tune a first sub-model of a system (e.g., the first sub-model 108). At 502, the first sub-model (e.g., the first sub-model 108) may be trained. The first sub-model may be trained on the reconstructed training data pairs. Each pair of training data may be generated based at least in part on extracting music-related attributes from lyrics. Each pair of training data may comprise selected lyrics having a rhyme pattern and a reconstructed prompt indicative of the music-related attributes. The first sub-model may comprise a machine learning model.

At 504, a user input may be received by a second sub-model of the system (e.g., the second sub-model 202 of the system 200). The user input may comprise text specifying content (e.g., a topic, a keyword, a central sentence, a theme, etc.) of lyrics to be generated by the system. The second sub-model may further receive format attributes. The format attributes may be determined based on at least one piece of music. The format attributes may indicate a format of the piece(s) of music. The format attributes may indicate a target (e.g., desired, ideal) number of lines for the lyrics to be generated. The format attributes may indicate a target (e.g., desired, ideal) range of syllables in each line of the lyrics to be generated. The piece(s) of music may be predetermined (e.g., preselected). The piece(s) of music may comprise a piece of music for which the lyrics are being generated.

At 506, a prompt may be generated. The prompt may be generated based on the text and the format attributes. The prompt may be generated by the second sub-model. The prompt may be generated based on integrating the user input (e.g., text) with the format attributes. For example, if the user input is "party" and the format attribute indicate that the target number of lines is thirteen lines and the target range of syllables in each line is five to seven, the generated prompt may be as follows: "Write a thirteen-line paragraph of lyrics about a party. Each line of the lyrics should contain five to seven syllables."

At 508, a plurality of sets of lyrics may be generated. The plurality of sets of lyrics may be generated by the first sub-model (e.g., the first sub-model 108). The plurality of sets of lyrics may be generated based on the generated prompt. At 510, the plurality of sets of lyrics may be ranked. The plurality of sets of lyrics may be ranked by a third sub-model of the system (e.g., the third sub-model 201). The plurality of sets of lyrics may be ranked based on predetermined music-related rules. The predetermined music-related rules may comprise a first rule associated with a number of lyric lines, a second rule associated with a range of syllables in each lyric line, and a third rule associated with a rhyme pattern.

Figure 6:
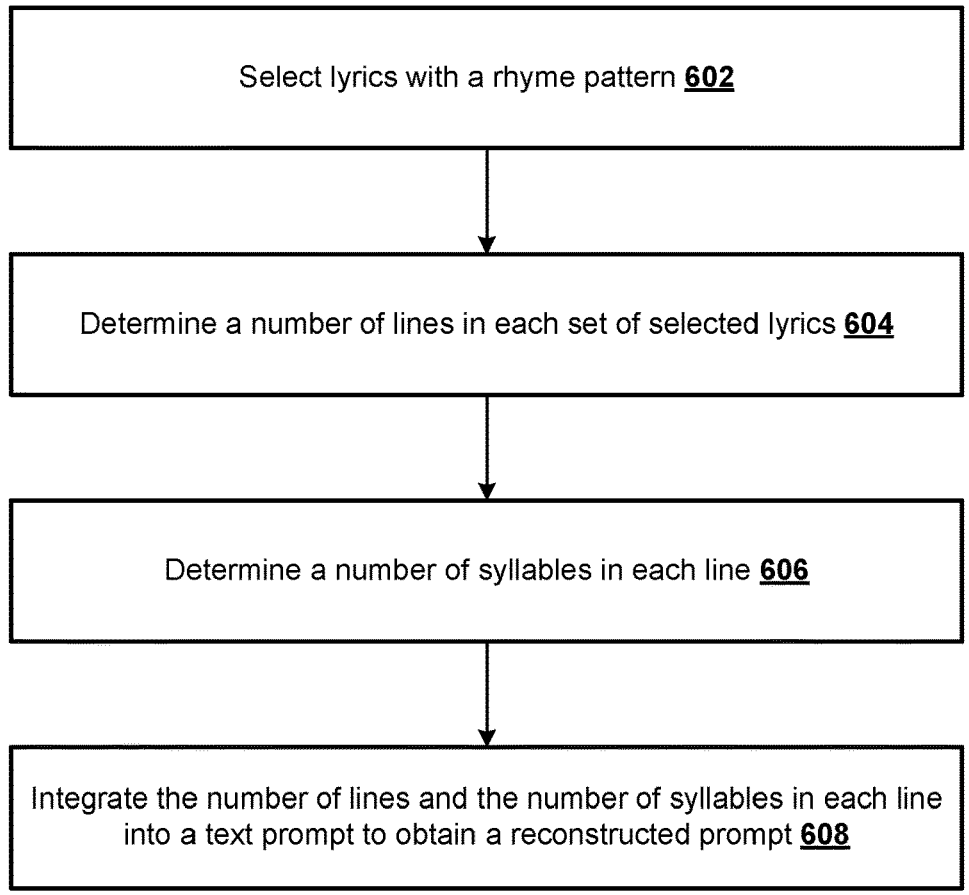
FIG. 6 shows an example process for generating training data in accordance with the present disclosure.

FIG. 6 illustrates an example process 600 for generating training data. Although depicted as a sequence of operations in FIG. 6, those of ordinary skill in the art will appreciate that various embodiments may add, remove, reorder, or modify the depicted operations.

Text may be input into (e.g., received by) a language model. The text may indicate content (e.g., a topic, a keyword, a central sentence, a theme, etc.) associated with song lyrics to be generated. The language model may generate a set of lyrics based on the text. This process may be repeated numerous times (e.g., with the same and/or with different input text) to generate a plurality of sets of raw lyric data (e.g., copyright free lyric data). The plurality of sets of raw lyric data corresponding to the input texts.

At 602, lyrics with a rhyme pattern may be selected. Lyrics having rhyme pattern(s) may be selected from the plurality of sets of raw lyric data. The selected lyrics may have the same or different rhyming patterns. The selected lyrics may still comprise some raw lyric data that do not have a rhyming pattern, but the percentage of the selected lyrics having rhyming pattern(s) may be greater than the percentage of the plurality of sets of raw lyric data having a rhyming pattern. Initial data pairs may be generated based on selecting lyrics with rhyme pattern(s) from raw lyrics data (i.e., the plurality of sets of raw lyric data 103). Each of the initial data pairs may comprise an initial prompt (e.g., input text) and a set of selected lyrics corresponding to the initial prompt (e.g., input text). The initial data pairs may be reconstructed to generate reconstructed training data pairs (e.g., the training data pairs 107). Reconstructing the initial data pairs may comprise determining music-related attributes associated with the selected lyrics in each of the initial data pairs. The music-related attributes may be lyric format-related attributes (e.g., attributes related to the format of a set of lyrics). For example, the music-related attributes may comprise a number of lines in each set of selected lyrics. At 604, a number of lines in each set of selected lyrics may be determined. The music-related attributes may comprise a number of syllables or a syllable range in each lyric. At 606, a number of syllables in each lyric line may be determined. Any other music-related attributes and/or lyric format-related attributes may be determined.

Reconstructing the initial data pairs may comprise reconstructing the prompt in each of the initial data pairs. The prompt in each of the initial data pairs may be reconstructed based on integrating the initial prompt (e.g., text) with the determined music-related attributes. At 608, the number of lines and the number of syllables in each line may be integrated into the initial text prompt to obtain a reconstructed prompt. For example, the reconstructed prompt for a pair of training data may follow this template: "Write a n-line paragraph of lyrics about x. Each line of the lyrics should contain a-b syllables," wherein "x" corresponds to the initial prompt (e.g., text), "n" represents the number of lines in the lyrics, and "a-b" indicates the syllable range for each sentence or lyric line.

After prompt reconstruction, the generated training data pairs may each comprise the reconstructed prompt and the corresponding set of selected lyrics with a rhyme pattern. As one example, if the initial data pair comprises (i) the prompt "love" and (ii) a set of selected lyrics about love, and the reconstructed prompt for this training data pair is "Write a fifteen-line paragraph of lyrics about love. Each line of the lyrics should contain five to ten syllables," the reconstructed training data pair may comprise (i) the reconstructed prompt "Write a fifteen-line paragraph of lyrics about love. Each line of the lyrics should contain five to ten syllables," and (ii) a set of selected lyrics about love that has rhyme pattern(s).

FIG. 7 illustrates an example process 700 for generating a prompt. Although depicted as a sequence of operations in FIG. 7, those of ordinary skill in the art will appreciate that various embodiments may add, remove, reorder, or modify the depicted operations.

At 702, a user input may be received by a second sub-model of the system. The user input may comprise text specifying content (e.g., a topic, a keyword, a central sentence, a theme, etc.) of lyrics to be generated by the system. The second sub-model may further receive format attributes. A music-related attribute generator may determine the format attributes. The format attributes may be determined based on at least one piece of music. The piece(s) of music may be predetermined (e.g., preselected). The piece(s) of music may comprise a piece of music for which the lyrics are being generated.

The format attributes may indicate a format of the piece(s) of music. The format attributes may indicate a target (e.g., desired, ideal) number of lines for the lyrics to be generated. At 704, the target number of lines in the lyrics to be generated may be determined. The format attributes may indicate a target (e.g., desired, ideal) range of syllables in each line of the lyrics to be generated. At 706, the target range of syllables in each line of the lyrics to be generated may be determined.

At 708, a prompt may be generated. The prompt may be generated based on the text, the target number of lines in the lyrics, and the target range of syllables in each line of the lyrics. The prompt may be generated by the second sub-model. The prompt may be generated based on integrating the user input (e.g., text) with the target number of lines in the lyrics and the target range of syllables in each line of the lyrics.

FIG. 8 illustrates an example process 800 for generating a prompt. Although depicted as a sequence of operations in FIG. 8, those of ordinary skill in the art will appreciate that various embodiments may add, remove, reorder, or modify the depicted operations.

A training data generator may generate initial data pairs based on (e.g., using) a plurality of sets of raw lyric data (e.g., the plurality of sets of raw lyric data 103) and corresponding input texts. A prompt reconstructor may reconstruct the initial data pairs to generate training data pairs. Reconstructing the initial data pairs may comprise extracting music-related attributes from the selected lyrics having rhyme pattern(s). The music-related attributes may be lyric format-related attributes (e.g., attributes related to the format of a set of lyrics). For example, the music-related attributes may comprise a number of lines in the set of raw lyrics in each set of selected lyrics. The music-related attributes may comprise a number of syllables or a syllable range in each lyric line.

Reconstructing the initial data pairs may comprise reconstructing the prompt in each of the initial data pairs. The prompt in each of the initial data pairs may be reconstructed based on integrating the initial prompt (e.g., input text) with the determined music-related attributes. For instance, a reconstructed prompt for a pair of training data may follow this template: "Write a n-line paragraph of lyrics about x. Each line of the lyrics should contain a-b syllables," wherein "x" corresponds to the initial prompt (e.g., text), "n" represents the number of lines in the lyrics, and "a-b" indicates the syllable range for each sentence or lyric line.

After prompt reconstruction, the generated training data pairs may each comprise the reconstructed prompt indicative of the music-related attributes and the corresponding set of selected lyrics with rhyme pattern(s). The reconstructed training data pairs may be used to train or fine-tune a first sub-model of a system (e.g., the first sub-model 108). At 802, the first sub-model may be trained. The first sub-model may be trained on the reconstructed training data pairs. Each pair of training data may be generated based at least in part on extracting music-related attributes from lyrics. Each pair of training data may comprise the lyrics and a reconstructed prompt indicative of the music-related attributes. The first sub-model may comprise a machine learning model.

At 804, a user input may be received by a second sub-model of the system. The user input may comprise text specifying content (e.g., a topic, a keyword, a central sentence, a theme, etc.) of lyrics to be generated by the system. The second sub-model may further receive format attributes. A music-related attribute generator may determine the format attributes. The format attributes may be determined based on at least one piece of music. The piece(s) of music may be predetermined (e.g., preselected). The piece(s) of music may comprise a piece of music for which the lyrics are being generated.

At 806, a prompt may be generated. The prompt may be generated based on the text and the format attributes. The prompt may be generated by the second sub-model. The prompt may be generated based on integrating the user input (e.g., text) with the format attributes. The prompt may have a structure that is consistent with a structure of the reconstructed prompt in each pair of training data.

FIG. 9 illustrates an example process 900 for implementing controllable lyrics generation. Although depicted as a sequence of operations in FIG. 9, those of ordinary skill in the art will appreciate that various embodiments may add, remove, reorder, or modify the depicted operations.

At 902, a plurality of sets of lyrics may be generated. The plurality of sets of lyrics may be generated by a first sub-model of a system. The plurality of sets of lyrics may be generated based on a prompt. The prompt may be generated based on user input and format attributes. At 904, a score corresponding to each of a plurality sets of lyrics may be determined. The score corresponding to each of a plurality sets of lyrics may be determined based on predetermined music-related rules and a weight assigned to each of the predetermined music-related rules.

For example, the predetermined music-related rules may comprise a first rule associated with a number of lyric lines. The first rule may be associated with a first weight. The predetermined music-related rules may comprise a second rule associated with a range of syllables in each lyric line. The second rule may be associated with a second weight. The predetermined music-related rules may comprise a third rule associated with a rhyme pattern. The third rule may be associated with a third weight. The first weight, second weight, and third weight may be adjusted (e.g., manually). A greater weight assigned to a particular rule may indicate that the rule is more important when ranking the plurality of sets of lyrics. For example, if the first rule is assigned a greater weight than the second and third rule, this may indicate that the number of lyric lines is more important than the range of syllables or the rhyme pattern when ranking the plurality of sets of lyrics.

At 906, the plurality sets of lyrics may be ranked. The plurality sets of lyrics may be ranked based on the score corresponding to each of the plurality sets of lyrics. For example, a ranking component may be configured to rank the plurality sets of lyric in an order from highest to lowest score. The ranking component may be configured to identify (e.g., determine) a predetermined number of top-ranking sets of lyrics as candidate sets of lyrics. At 908, a predetermined number of top-ranking sets of lyrics may be determined as candidate sets of lyrics. For example, the ranking component may be configured to identify (e.g., determine) the three top-ranking (e.g., highest scoring) sets of lyrics from the plurality sets of lyrics. The predetermined number of top-ranking (e.g., highest scoring) sets of lyrics may be the candidate sets of lyrics.

Figure 10:
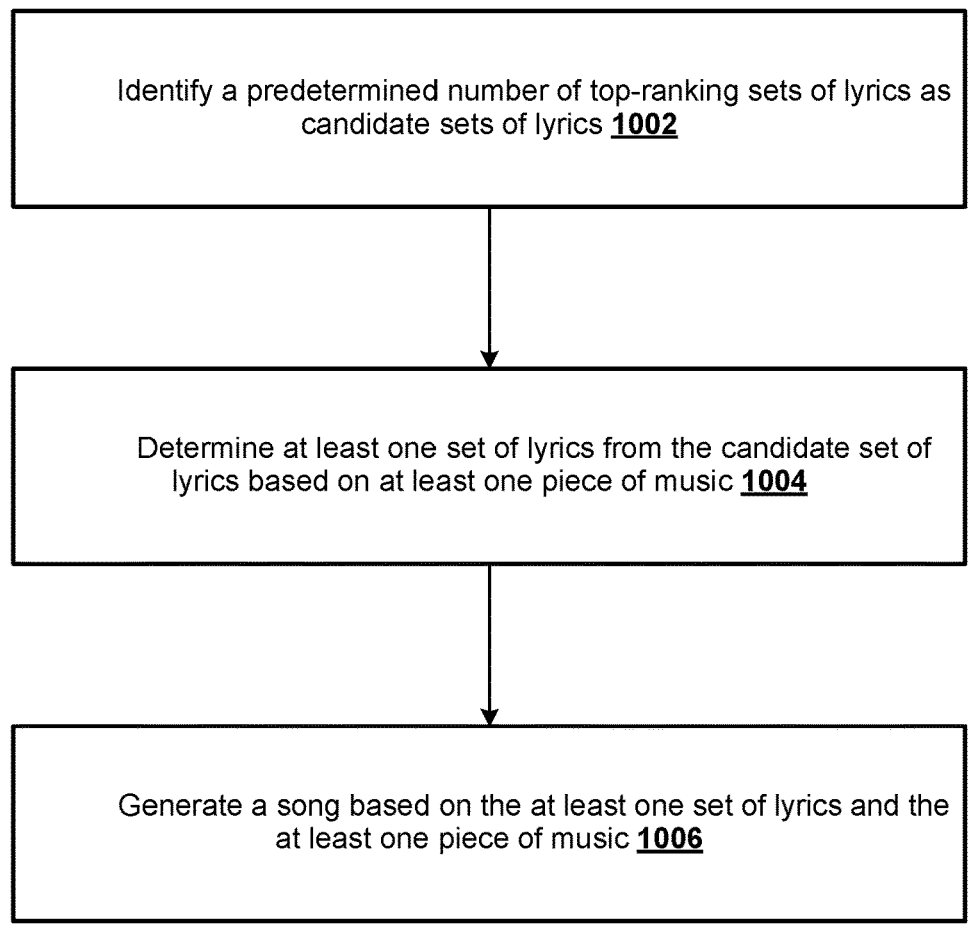
FIG. 10 shows an example process for generating a song based on machine-generated lyrics in accordance with the present disclosure.

FIG. 10 illustrates an example process 1000 for implementing song generation. Although depicted as a sequence of operations in FIG. 10, those of ordinary skill in the art will appreciate that various embodiments may add, remove, reorder, or modify the depicted operations.

A ranking component may be configured to identify (e.g., determine) a predetermined number of top-ranking sets of lyrics as candidate sets of lyrics. At 1002, a predetermined number of top-ranking sets of lyrics may be determined as candidate sets of lyrics. For example, the ranking component may be configured to identify (e.g., determine) the three top-ranking (e.g., highest scoring) sets of lyrics from the plurality sets of lyrics. The predetermined number of top-ranking (e.g., highest scoring) sets of lyrics may be the candidate sets of lyrics.

A lyric selector may receive the candidate sets of lyrics from the system. The lyric selector may determine at least one set of lyrics from the candidate sets of lyrics. At 1004, at least one set of lyrics from the candidate set of lyrics may be determined. The at least one set of lyrics may be determined based on at least one piece of music. For example, the lyric selector may determine which one of the candidate sets of lyrics sounds best (e.g., fits best) with the melody of the piece(s) of music. The lyric selector may send the selected set(s) of lyrics to a song generator. The song generator may generate a song based on the selected set(s) of lyrics and the piece(s) of music. At 1006, a song may be generated. The song may be generated based on the at least one set of lyrics and the at least one piece of music.

The ability of the system 200 described herein to control the number of lines in generated lyrics (e.g., generate lyrics with the same number of lines as indicated in the prompt) was compared with the ability of existing techniques to control the number of lines in generated lyrics. The experimental results show that the system 200 can control the number of lines in the generated lyrics with 100% accuracy whereas existing techniques can only control the number of lines in the generated lyrics with approximately 97.2% and 72% accuracy, respectively.

The ability of the system 200 to control the syllable range in generated lyrics (e.g., generate lyrics with the syllable range as indicated in the prompt) was compared with the ability of two existing techniques to control the syllable range in generated lyrics. The experimental results show that the system 200 can control the syllable range in the generated lyrics with approximately 81% accuracy (a score of 1 indicates 100% accuracy), whereas the existing techniques can only control the syllable range in the generated lyrics with approximately 46% and 36.3% accuracy, respectively. Thus, the evaluation results illustrate that the system 200 described herein performs better than existing techniques for controllable lyric generation.

Figure 11:
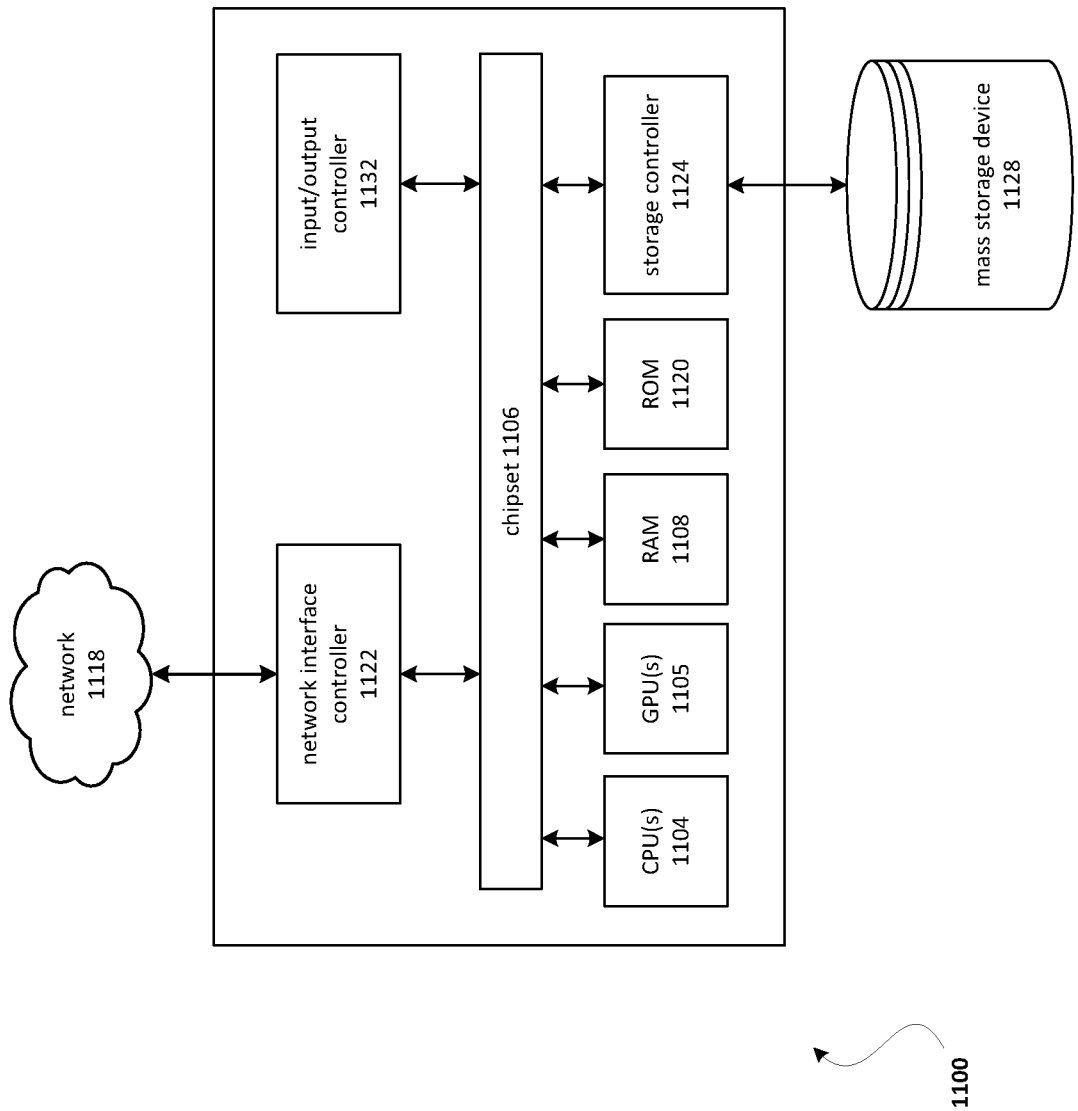
FIG. 11 shows an example computing device which may be used to perform any of the techniques disclosed herein.

FIG. 11 illustrates a computing device that may be used in various aspects, such as the models, sub-models, components, and/or devices depicted in any of FIGS. 1-4. With regard to FIGS. 1-4, any or all of the components may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1110. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for implementing controllable lyrics generation, comprising:
   training a first sub-model of a system on training data pairs, wherein each pair of training data is generated based at least in part on extracting music-related attributes from lyrics, and wherein each pair of training data comprises the lyrics and a reconstructed prompt indicative of the music-related attributes;
   receiving a user input by a second sub-model of the system, wherein the user input comprises text specifying a theme of lyrics to be generated by the system;
   generating a prompt based on the text and format attributes by the second sub-model, wherein the format attributes are determined based on at least one piece of music;
   generating a plurality of sets of lyrics by the first sub-model based on the generated prompt; and
   ranking the plurality of sets of lyrics by a third sub-model of the system, wherein the plurality of sets of lyrics are ranked based on predetermined music-related rules.

2. The method of claim 1, further comprising generating the training data pairs, wherein the generating the training data pairs comprises:
   selecting lyrics with a rhyme pattern;
   determining a number of lines in each set of selected lyrics; and
   determining a number of syllables in each line.

3. The method of claim 2, wherein the generating the training data pairs further comprises:
   integrating the number of lines and the number of syllables in each line into a text prompt to obtain the reconstructed prompt.

4. The method of claim 1, further comprising:
   determining the format attributes based on the at least one piece of music, wherein the determining the format attributes based on the at least one piece of music comprises:
   determining a target number of lines in the lyrics to be generated, and
   determining a target range of syllables in each line of the lyrics to be generated.

5. The method of claim 1, further comprising:
   generating the prompt with a structure that is consistent with a structure of the reconstructed prompt in each pair of training data.

6. The method of claim 1, wherein the predetermined music-related rules comprise a first rule associated with a number of lyric lines, a second rule associated with a range of syllables in each lyric line, and a third rule associated with a rhyme pattern.

7. The method of claim 1, further comprising:
   determining a score corresponding to each of the plurality sets of lyrics based on each of the predetermined music-related rules and a weight assigned to each of the predetermined music-related rules.

8. The method of claim 7, further comprising:
   ranking the plurality sets of lyrics based on the score corresponding to each of the plurality sets of lyrics; and
   identifying a predetermined number of top-ranking sets of lyrics as candidate sets of lyrics.

9. The method of claim 8, further comprising:
   determining at least one set of lyrics from the candidate set of lyrics based on the at least one piece of music; and
   generating a song based on the at least one set of lyrics and the at least one piece of music.

10. A system for implementing controllable lyrics generation, comprising:
    at least one processor; and
    at least one memory communicatively coupled to the at least one processor and comprising computer-readable instructions that upon execution by the at least one processor cause the at least one processor to perform operations comprising:
    training a first sub-model of a system on training data pairs, wherein each pair of training data is generated based at least in part on extracting music-related attributes from lyrics, and wherein each pair of training data comprises the lyrics and a reconstructed prompt indicative of the music-related attributes;

receiving a user input by a second sub-model of the system, wherein the user input comprises text specifying a theme of lyrics to be generated by the system;

generating a prompt based on the text and format attributes by the second sub-model, wherein the format attributes are determined based on at least one piece of music;

generating a plurality of sets of lyrics by the first sub-model based on the generated prompt; and ranking the plurality of sets of lyrics by a third sub-model of the system, wherein the plurality of sets of lyrics are ranked based on predetermined music-related rules.

11. The system of claim 10, the operations further comprising generating the training data pairs, wherein the generating the training data pairs comprises:

selecting lyrics with a rhyme pattern;

determining a number of lines in each set of selected lyrics; and determining a number of syllables in each line.

12. The system of claim 11, wherein the generating the training data pairs further comprises:

integrating the number of lines and the number of syllables in each line into a text prompt to obtain the reconstructed prompt.

13. The system of claim 10, the operations further comprising:

determining the format attributes based on the at least one piece of music, wherein the determining the format attributes based on the at least one piece of music comprises:

determining a target number of lines in the lyrics to be generated, and determining a target range of syllables in each line of the lyrics to be generated.

14. The system of claim 10, the operations further comprising:

generating the prompt with a structure that is consistent with a structure of the reconstructed prompt in each pair of training data.

15. The system of claim 10, the operations further comprising:

determining a score corresponding to each of the plurality sets of lyrics based on each of the predetermined music-related rules and a weight assigned to each of the predetermined music-related rules;

ranking the plurality sets of lyrics based on the score corresponding to each of the plurality sets of lyrics; and identifying a predetermined number of top-ranking sets of lyrics as candidate sets of lyrics.

16. A non-transitory computer-readable storage medium, storing computer-readable instructions that upon execution by a processor cause the processor to implement operations comprising:

training a first sub-model of a system on training data pairs, wherein each pair of training data is generated based at least in part on extracting music-related attributes from lyrics, and wherein each pair of training data comprises the lyrics and a reconstructed prompt indicative of the music-related attributes;

receiving a user input by a second sub-model of the system, wherein the user input comprises text specifying a theme of lyrics to be generated by the system;

generating a prompt based on the text and format attributes by the second sub-model, wherein the format attributes are determined based on at least one piece of music;

generating a plurality of sets of lyrics by the first sub-model based on the generated prompt; and ranking the plurality of sets of lyrics by a third sub-model of the system, wherein the plurality of sets of lyrics are ranked based on predetermined music-related rules.

17. The non-transitory computer-readable storage medium of claim 16, the operations further comprising generating the training data pairs, wherein the generating the training data pairs comprises:

selecting lyrics with a rhyme pattern;

determining a number of lines in each set of selected lyrics;

determining a number of syllables in each line; and integrating the number of lines and the number of syllables in each line into a text prompt to obtain the reconstructed prompt.

18. The non-transitory computer-readable storage medium of claim 16, the operations further comprising:

determining the format attributes based on the at least one piece of music, wherein the determining the format attributes based on the at least one piece of music comprises:

determining a target number of lines in the lyrics to be generated, and determining a target range of syllables in each line of the lyrics to be generated.

19. The non-transitory computer-readable storage medium of claim 16, the operations further comprising:

generating the prompt with a structure that is consistent with a structure of the reconstructed prompt in each pair of training data.

20. The non-transitory computer-readable storage medium of claim 16, the operations further comprising:

determining a score corresponding to each of the plurality sets of lyrics based on each of the predetermined music-related rules and a weight assigned to each of the predetermined music-related rules;

ranking the plurality sets of lyrics based on the score corresponding to each of the plurality sets of lyrics; and identifying a predetermined number of top-ranking sets of lyrics as candidate sets of lyrics.

* * * * *